United States Patent Office 2,891,925
Patented June 23, 1959

2,891,925

PROCESS FOR PROMOTING THE LOW-HYSTERESIS PROCESSING OF RUBBER AND CARBON BLACK USING AN AROMATIC TRIAZENE

Kenneth W. Doak, Bloomfield, N.J., assignor to United States Rubber Company, New York, N.Y., a corporation of New Jersey No Drawing. Application January 13, 1954
Serial No. 403,915

11 Claims. (Cl. 260—41.5)

This invention relates to improvements in the technique of processing high carbon black and rubber mixes prior to vulcanization thereof, and more particularly to improvements in so-called "low-hysteresis" processing of carbon black and rubber mixes.

The technique of processing high carbon black and rubber mixes prior to vulcanization thereof, whereby to obtain vulcanizates with improvements in physical and chemical properties, is described in Gerke et al. U.S.P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration will be found suitable for most purposes, and particularly within the preferred temperature range.

An object of the present invention is to provide new chemical promoters for the processing of rubber and carbon black mixes as described in U.S.P. 2,118,601 whereby to obtain high electrical resistance and low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that certain aromatic triazenes substantially decrease the time and/or lower the temperature required for low-hysteresis processing of mixtures of rubber and carbon black. They are effective in natural rubber (Hevea); synthetic rubbery homopolymers of aliphatic conjugated diolefin hydrocarbons, especially butadiene and isoprene; and synthetic rubbery copolymers of such diolefin hydrocarbons with copolymerizable monoolefinic compounds, such as styrene, alpha-methylstyrene, methyl acrylate, ethyl acrylate, methyl methacrylate, acrylonitrile, methyl vinyl ketone, methyl isopropenyl ketone, and monovinylpyridines, which copolymers contain at least 25% of combined diolefin. These aromatic triazenes are particularly effective in Hevea rubber and in rubbery copolymers of butadiene and styrene (known as "GR-S") and in rubbery copolymers of butadiene and acrylonitrile (known as GR-A). They are of course effective in compatible mixtures of the aforementioned rubbery materials, for example, in blends of Hevea rubber with rubbery copolymers of butadiene and styrene. The aromatic triazenes are only slightly effective in "Butyl" rubber.

The aromatic triazenes which I employ in the process of my invention are derivatives of the hypothetical parent compound triazene, $HN=N-NH_2$, in which one hydrogen has been replaced by an aryl group, and at least one other hydrogen has been replaced by a group selected from alkyl, aralkyl, aryl, acyl, amino, hydroxyl, cyanoguanyl

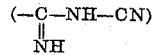

arylsulfonyl, carbamyl, thiocarbamyl, phenyldiazo, and phenylcarbamyl. The alkyl group will usually not contain over 6 carbon atoms. The aralkyl group will usually be benzyl. The aryl group is usually selected from phenyl, diphenyl and naphthyl, and phenyl, diphenyl and naphthyl which are substituted with methyl, chloro or nitro. The acyl group will usually be derived from saturated monocarboxylic acids containing not more than 6 carbon atoms or from monocyclic aromatic monocarboxylic acids. The preferred triazenes are those which are substantially decomposed in less than twenty minutes in the temperature range from 200° to 400° F. These triazenes are sufficiently stable at mixing temperatures to enable sufficient mixing with the rubber and black prior to decomposition. If the decomposition of the triazene were too slow, the advantages of using the promoter would be greatly decreased.

The preferred classes of triazenes are represented by the formula

(1) In one such class, $R_1$ and $R_3$ are aryl groups, and $R_2$ is hydrogen, alkyl, aralkyl, aryl, acyl, phenylcarbamyl, amino, or hydroxyl. (When $R_1$ and $R_3$ are unlike aryl groups and $R_2$ is hydrogen, the $R_1$ and $R_3$ are interchangeable, that is, it is not known to scientists whether the structure of a given compound is $R_1-N=N-NH-R_3$ or $R_3-N=N-NH-R_1$).

Examples of these triazenes are 1,3-diphenyltriazene (commonly called diazoaminobenzene), 1 - phenyl-3-tolyltriazine, 1 - (chlorophenyl)-3 - phenyltriazine, 1-(nitrophenyl) - 3 - phenyltriazene, 3 - (nitrophenyl) - 1-tolyltriazene, 1,3 - ditolyltriazene, 3 - (chlorophenyl)-1-p-tolyltriazene (the chlorine being m or p), 1,3-di-(o-chlorophenyl) - triazene, 1,3 - di - (p-chlorophenyl)-triazene, 1,3 - di-(m-chlorophenyl) - triazene, 1 - p - chlorophenyl - 3 - (p - nitrophenyl) - triazene, 1,3 - di - (2,3-xylyl) - triazene, 1,3-di-o-xenyltriazene, 3-beta-naphthyl-1 - phenyltriazene, 3 - beta-naphthyl-1-p-tolyltriazene, 3-alpha-naphthyl - 1 - phenyltriazene, 1,3-bis-(2,4-dichlorophenyl) - triazene, 1,3,3 - triphenyltriazene, 3,3-diphenyl-1 - tolytriazene, 3,3 - diphenyl - 1 - (chlorophenyl)-triazene, 3 - methyl - 1,3 - diphenyltriazene, 3 - ethyl - 1,3-diphenyltriazene, 3 - methyl-1-(p-nitrophenyl)-3 - phenyltriazene, 3 - benzyl - 1,3 - diphenyltriazene, 3-benzyl-1,3-ditolyltriazene (the tolyl groups being o or p), 3-acetyl-1,3 - diphenyltriazene, 3 - acetyl - 1,3-di-p-tolyltriazene, 3 - acetyl - 1 - phenyl - 3 - p-tolyltriazene, 3-benzoyl-1,3-diphenyltriazene, 3-benzoyl-1-phenyl - 3 - p-tolyltriazene, 1,3 - diphenyl - 3 - (phenylcarbamyl) - triazene, 1-phenyl-3 - (phenylcarbamyl) - 3 - p-tolyltriazene, 3 - phenyl-3-(phenylcarbamyl) - 1 - m-tolyltriazene, 1,3 - diphenyl-3-

(p-tolylcarbamyl) - triazene, 3 - hydroxy - 1,3-diphenyl-triazene, 3 - hydroxy - 3 - phenyl - 1-p-tolyltriazene, 3-hydroxy - 1 - (p-nitrophenyl) - 3-phenyltriazene, 3-hydroxy - 1 - phenyl - 3 - tolyltriazene, 3 - hydroxy - 1-tolyl-3-p-tolyltriazene, 3 - amino-1,3 - diphenyltriazene (i.e., 1,3 - diphenyl - 1 - tetrazene), and 1,3 - bis-(2,4,6-trichlorophenyl) - triazene. Wherever the location of substituents on benzene rings is not specified herein, all of the o-, m-, and p-isomers of the named triazenes are known.

(2) In another class under the general formula, $R_1$ is aryl, and $R_2$ and $R_3$ are alkyl groups. Examples of these triazenes are 3,3-dimethyl-1-phenyltriazene, 3,3-diethyl-1-phenyltriazene, and 3,3-dimethyl-1-p-tolyltriazene.

Other triazenes which are effective in the process of my invention are 1-(cyanoguanyl)-3-methyl-3 - tolyltriazene, 1 - (cyanoguanyl) - 3 - methyl - 3 - phenyltriazene, 3-benzyl - 1 - (cyanoguanyl) - 3 - tolyltriazene, 1-(cyanoguanyl) - 3 - tolyltriazene, 3 - p-chlorophenyl - 1-(cyanoguanyl) - 3 - methyltriazene, 3 - methyl - 3-phenyl-1 - (p-tolylsulfonyl) triazene, 3 - carbamyl - 1 - phenyl-triazene, 1 - phenyl - 3 - (phenylsulfonyl)triazene, 1-phenyl - 3 - thiocarbamyltriazene, 3 - methyl - 3 - phenyl-1 - thiocarbamyltriazene, 1 - chlorophenyl - 3 - thiocarbamyltriazene (the chlorine being o or p), and N,N-bis (benzenediazo) - methylamine (i.e., 3 - methyl-1,5-diphenyl - 1,4 - pentazdiene, having the formula

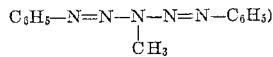

The process of my invention comprises mixing the rubber with a relatively large amount of a rubber-reinforcing carbon black and a relatively small but effective amount, viz., from 0.5 to 4 parts per 100 parts of rubbery material, of the triazene promoter, and heating this mixture at a temperature of from 250° F. to a temperature just short of that at which the rubber would be injured, e.g., heating it at 250–400° F., and masticating the mix during and/or after such heat treatment, to bring about the desired changes in the rubber and carbon black mixture whereby a vulcanizate of this mixture will have a considerably reduced torsional hysteresis or a considerably increased electrical resistivity. This heat treatment is carried out in the absence of vulcanizing materials, e.g., sulfur or sulfur-yielding compounds. Following the heat treatment, the vulcanizing and other desired compounding ingredients including conventional accelerators, if necessary or desired, and the like are intimately incorporated in the conventional manner, e.g., on a mill or in a Banbury mixer, after which the mixture is shaped and vulcanized in the usual way.

If desired, softeners, e.g., hydrocarbons commonly used as rubber softeners, and/or fatty acid, especially stearic acid, can be present during the heat treatment. If stearic acid is present in sufficient amount, its later addition is unnecessary.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and the triazene promoter is carried out by mastication at temperatures in the range 250–400° F., and more preferably in the range 275–375° F., with any suitable type of masticating equipment such as an open two-roll rubber mill or, more preferably, an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i.e., whether it is static or dynamic, type of equipment used, e.g., in the case of masticatory heat treatment whether an open rubber mill or a Banbury or other type of internal mixer is used, amount of triazene promoter used, etc. In any event, the treating time will be considerably shorter, at given temperature conditions, than the time required when the triazene promoter is omitted. In the case of the preferred masticatory treatment, times of the order of 5 to 30 minutes will generally be adequate for the purposes of my invention, the longer times being used at the lower temperatures and vice versa. It is well-known that different rubbers vary as to the highest temperatures they can withstand without harm and the time and temperature should of course be so regulated as to not impair the properties of the final vulcanizate. The optimum time and temperature will depend on the particular triazene being used.

It is preferable to form an intimate mixture of the rubber, carbon black and the triazene promoter at a temperature sufficiently below 250° F. so that premature and material decomposition of the triazene will not occur during the mixing step.

The following examples illustrate the preferred methods of practicing the invention. All parts are by weight.

*Example 1*

A masterbatch is prepared by mixing together 100 parts of Hevea rubber, 50 parts of carbon black (a medium processing channel black known commercially as "Spheron #6") and 5 parts of stearic acid. This mixing operation is carried out in the conventional manner in a Banbury mixer or on a two-roll rubber mill. To 155 parts of this masterbatch 2.0 parts of 1,3-diphenyltriazene are added on a two-roll rubber mill at a batch temperature of 150–200° F. The mill temperature is then raised to 300° F. and the mixture is masticated for 10 minutes. Thereafter the mill is cooled to 150–200° F. and 2 parts of pine tar, 2 parts of zinc oxide, 1 part of anti-oxidant, 1 part of accelerator, and 2.6 parts of sulfur are incorporated. The mixture is placed in a suitable mold and vulcanized 45 minutes at 287° F. As a control an identical masterbatch is prepared and subjected to all the previously described manipulative steps except that no 1,3-diphenyltriazene is added to the mixture. The specific electrical resistivity and torsional hysteresis of the vulcanizates are measured, with the following results:

| Promoter | Log Resistivity | Tors. Hyst., 280° F. |
|---|---|---|
| None | 7.6 | 0.133 |
| 1,3-Diphenyltriazene | >13.0 | 0.063 |

The practice of the invention has thus decreased the torsional hysteresis at 280° by over 50% and has increased the specific electrical resistivity by a factor of over 250,000.

The above described mixing and mastication steps may all be conveniently carried out in a Banbury mixer.

Example 2

A masterbatch is prepared by mixing together 70 parts of a butadiene-styrene copolymer (known as GR-S, polymerized at 41° F.), 30 parts of Hevea rubber, 55 parts of "Spheron #6" channel black, 5 parts of hydrocarbon softener, and 2 parts of stearic acid. This mixing operation is carried out in a conventional manner in a Banbury mixer or two-roll rubber mill. To 162 parts of this masterbatch is added 1.5 parts of 1,3-diphenyltriazene at a batch temperature preferably below 225° F. The mixture is then masticated in a Banbury mixer for 6 minutes at 325° F. The stock is then mold-cured with 3 parts of zinc oxide, 1.8 parts of sulfur, 0.65 part of 2-mercaptobenzothiazole, and 0.25 part of diphenylguanidine. The specific electrical resistivity and torsional hysteresis are measured. Another sample is prepared in an identical manner except that no 1,3-diphenyltriazene is used, and it is vulcanized with 2.2 parts of sulfur instead of 1.8 parts in order to secure a comparable state of cure.

| Promoter | Log Resistivity | Tors. Hyst., 280° F. |
|---|---|---|
| None | 8.0 | .149 |
| 1,3-Diphenyltriazene | 12.0 | .078 |

By practice of the invention the specific electrical resistivity is increased by a factor of 10,000, and the torsional hysteresis is decreased by 48%.

Example 3

A masterbatch is prepared in a conventional manner by mixing together 100 parts of a butadiene-styrene copolymer, 52 parts of "Spheron #6" channel black, 6 parts of hydrocarbon softener, and 1 part of stearic acid. To 159 parts of this masterbatch is added 2.0 parts of 1,3-diphenyltriazene at a batch temperature below 225° F. The mixture is then masticated in a Banbury mixer for 8 minutes at 325° F. Vulcanizing ingredients are then added in the usual manner (3 parts of zinc oxide, 1 part of 2-mercaptobenzothiazole, 0.1 part of diphenylguanidine, and 1.3 parts of sulfur). The stock is vulcanized for 30 minutes at 293° F. An identical masterbatch is subjected to the same manipulative steps, except that no 1,3-diphenyltriazene is used, and the stock is vulcanized with 3 parts of zinc oxide, 1 part of 2-mercaptobenzothiazole, 0.25 part of diphenylguanidine, and 2 parts of sulfur, to obtain a comparable state of cure.

| Promoter | Log Resistivity | Tors. Hyst., 280° F. |
|---|---|---|
| None | 7.4 | 0.175 |
| 1,3-Diphenyltriazene | >13.0 | .083 |

The practice of the invention has increased the specific electrical resistivity by a factor of at least about 400,000, and has decreased the torsional hysteresis at 280° F. by over 50%.

Example 4

An experiment is carried out in a manner similar to Example 1, except that 1.5 parts of 1,3-di-(p-tolyl)-triazene is used. The stocks, after vulcanization, show the following properties:

| Promoter | Log Resistivity | Tors. Hyst., 280° F. |
|---|---|---|
| None | 7.7 | 0.111 |
| 1,3-Di-(p-tolyl)-triazene | >13.0 | 0.059 |

The practice of the invention has thus increased the specific electrical resistivity by a factor of at least about 200,000, and has reduced the torsional hysteresis by 47%.

Example 5

A masterbatch is prepared by mixing in a conventional manner 100 parts of a copolymer of butadiene and acrylonitrile (known commercially as "Paracril 18–80"), 50 parts of "Spheron #6" carbon black, 6 parts of a hydrocarbon oil softener, and 1 part of stearic acid. To this masterbatch is added 2.0 parts of 1,3-di-(p-tolyl)-triazene at a temperature below 225° F. The mixture is then masticated in a laboratory Banbury mixer for 8 minutes at 325° F. Thereafter, 5 parts of zinc oxide, 0.8 part of 2-mercaptobenzothiazyl disulfide, and 1.1 parts of sulfur are incorporated in the batch in a conventional manner. The stock is vulcanized 60 minutes at 293° F. As a control, another sample is subjected to the same treatment except that no promoter is used and the vulcanizing ingredients (in the amounts necessary to give the same state of cure) were 5 parts of zinc oxide, 1 part of 2-mercaptobenzothiazyl disulfide, and 1.6 parts of sulfur. The results are shown below.

| Promoter | Log Resistivity | Tors. Hyst., 280° F. | Rel. Abrasion Resistance |
|---|---|---|---|
| None | 8.0 | 0.157 | 100 |
| 1,3-Di-(p-tolyl)-triazene | 10.3 | 0.105 | 120 |

The practice of the invention has increased the specific electrical resistivity by a factor of about 200, has decreased the torsional hysteresis by 33%, and has increased the abrasion resistance by 20%.

Example 6

Experiments are carried out in the manner of Example 2, except that 60 parts of GR-S and 40 parts of Hevea rubber are used. Several different triazenes are used as promoters. Amounts of accelerators are adjusted to give comparable states of cure to the vulcanized stocks. The following results are obtained.

| Promoter | Parts | Log Resistivity | Tors. Hyst., 280° F. |
|---|---|---|---|
| None (control stock) | | 7.4 | 0.211 |
| 1,3-Diphenyltriazene | 1.8 | >13.0 | .091 |
| 3,3-Dimethyl-1-phenyl-triazene | 1.5 | >13.0 | .093 |
| 3-Methyl-1,3-diphenyl-triazene | 2.0 | >13.0 | .091 |
| 3-Hydroxy-1,3-diphenyl-triazene | 0.6 | 9.4 | .123 |
| N,N-bis-(benzenediazo)-methylamine | 1.0 | 11.1 | .107 |

These results show that the compounds tested are all effective in reducing the torsional hysteresis and increasing the specific electrical resistivity of the stocks.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and the triazene promoter in any suitable manner and then heat this mixture at 250–400° F. without simultaneously masticating it, the heat treated mixture being subsequently masticated and compounded with conventional compounding and vulcanizing ingredients followed by shaping and vulcanizing in the usual way. The static heat treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 250–400° F. for a long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further details of this test see Gerke et al., 2,118,601.

Having thus described my invention, what I claim and desire to protect by Letters Patent is:

1. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of an aromatic triazene in which one hydrogen of the hypothetical parent triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, heating the mixture at a temperature of at least 250° F. but below that at which the rubber would be harmed, masticating the mixture and completing incorporation of vulcanizing and other desired ingredients, shaping the mass, and vulcanizing the resulting shaped mass.

2. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of an aromatic triazene in which one hydrogen of the hypothetical compound triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, masticating the mixture at a temperature of from 250° to 400° F., thereafter incorporating vulcanizing and other desired ingredients, shaping the mass, and vulcanizing the resulting shaped mass.

3. A process which comprises mixing Hevea rubber with a relatively large amount of rubber-reinforcing carbon black, and from 0.5 to 4 parts, per 100 parts of said rubber, of an aromatic triazene in which one hydrogen of the hypothetical compound triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, masticating the mixture at a temperature of from 250° to 400° F., thereafter incorporating vulcanizing and other desired ingredients, shaping the mass, and vulcanizing the resulting shaped mass.

4. A process which comprises mixing a rubbery copolymer of butadiene and styrene with a relatively large amount of rubber-reinforcing carbon black, and from 0.5 to 4 parts, per 100 parts of said copolymer, of an aromatic triazene in which one hydrogen of the hypothetical compound triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, masticating the mixture at a temperature of from 250° to 400° F., thereafter incorporating vulcanizing and other desired ingredients, shaping the mass, and vulcanizing the resulting shaped mass.

5. A process which comprises mixing rubber comprising a mixture of natural rubber and a rubbery butadiene-styrene copolymer with a relatively large amount of rubber-reinforcing carbon black, and from 0.5 to 4 parts, per 100 parts of said rubber, of an aromatic triazene in which one hydrogen of the hypothetical compound triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, masticating the mixture at a temperature of from 250° to 400° F., thereafter incorporating vulcanizing and other desired ingredients, shaping the mass, and vulcanizing the resulting shaped mass.

6. A process which comprises mixing a rubbery copolymer of butadiene and acrylonitrile with a relatively large amount of rubber-reinforcing carbon black, and from 0.5 to 4 parts, per 100 parts of said copolymer, of an aromatic triazene in which one hydrogen of the hypothetical compound triazene has been replaced by an aryl group and at least one other hydrogen has been replaced by a group selected from the group consisting of alkyl, aralkyl, aryl, acyl, amino, hydroxyl, cyanoguanyl, arylsulfonyl, carbamyl, thiocarbamyl, phenyldiazo, and phenylcarbamyl, masticating the mixture at a temperature of from 250° to 400° F., thereafter incorporating vulcanizing and other desired ingredients, shaping the mass, and vulcanizing the resulting shaped mass.

7. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of 1,3-diphenyl-triazene, masticating the mixture at a temperature of from 250° to 400° F., thereafter incorporating vulcanizing and other desired ingredients, shaping the mass, and vulcanizing the resulting shaped mass.

8. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of 1,3-di-p-tolyl-triazene, masticating the mixture at a temperature of from 250° to 400° F., thereafter incorporating vulcanizing and other desired ingredients, shaping the mass, and vulcanizing the resulting shaped mass.

9. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of 3,3-di-methyl-1-phenyltriazene, masticating the mixture at a temperature of from 250° to 400° F., thereafter incorporating vulcanizing and other desired ingredients, shaping the mass, and vulcanizing the resulting shaped mass.

10. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of 3-methyl-1,3-diphenyltriazene, masticating the mixture at a temperature of from 250° to 400° F., thereafter incorporating vulcanizing and other desired ingredients, shaping the mass, and vulcanizing the resulting shaped mass.

11. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds which copolymers contain at least 25% of combined diolefin hydrocarbon, with a relatively large amount of rubber-reinforcing carbon black, and from 0.5 to 4 parts, per 100 parts of said rubber, of N,N-bis-(phenyldiazo)-methylamine, masticating the mixture at a temperature of from 250° to 400° F., thereafter incorporating vulcanizing and other desired ingredients, shaping the mass, and vulcanizing the resulting shaped mass.

References Cited in the file of this patent

UNITED STATES PATENTS

| | | |
|---|---|---|
| 2,118,601 | Gerke et al. | May 24, 1938 |
| 2,315,849 | Gerke | April 6, 1943 |
| 2,315,850 | Gerke | April 6, 1943 |
| 2,315,855 | Howland | April 6, 1943 |
| 2,315,856 | Howland | April 6, 1943 |
| 2,315,857 | Howland | April 6, 1943 |
| 2,466,826 | Romaine | April 12, 1949 |
| 2,658,092 | Barton | Nov. 3, 1953 |
| 2,710,287 | Barton et al. | June 7, 1955 |
| 2,715,618 | Doak | Aug. 16, 1955 |
| 2,715,650 | Doak | Aug. 16, 1955 |
| 2,734,885 | Doak | Feb. 14, 1956 |
| 2,734,886 | Doak | Feb. 14, 1956 |